United States Patent
Lee et al.

(10) Patent No.: US 6,480,222 B1
(45) Date of Patent: Nov. 12, 2002

(54) SEMICONDUCTOR LASER AND FLYING OPTICAL PICKUP FOR RECORDING/REPRODUCING USING THE SAME

(75) Inventors: Chul-woo Lee, Seoul (KR); Jang-hoon Yoo, Seoul (KR); Pyong-yong Seong, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/445,509

(22) Filed: May 22, 1995

(30) Foreign Application Priority Data

Jan. 24, 1995 (KR) ................................. 95/1227

(51) Int. Cl.[7] ................................. B41J 27/00
(52) U.S. Cl. ................................. 347/256
(58) Field of Search ................................. 347/256, 224, 347/238, 241, 244, 258

(56) References Cited

U.S. PATENT DOCUMENTS 4,980,893 A * 12/1990 Thornton et al. ............. 372/50

FOREIGN PATENT DOCUMENTS

JP 1181588 7/1989
JP 4141824 5/1992

* cited by examiner

Primary Examiner—Raquel Yvette Gordon
(74) Attorney, Agent, or Firm—Rothwell, Figg, Ernst & Manbeck

(57) ABSTRACT

A semiconductor laser for generating a laser beam and an optical pickup for recording/reproducing information using the semiconductor laser as an optical source are provided. The semiconductor laser includes an aperture member on an emitting end thereof to perform high-density memory recording/reproducing through the reduction of an optical spot. The aperture has a hole whose diameter is smaller than the width of the active region of the semiconductor laser, to thereby restrictively emit the laser beam via the hole so that the optical spot formed on an optical disk is reduced. Thus, high-density memory recording/reproducing, which is useful for miniaturized information processors, can be realized.

6 Claims, 3 Drawing Sheets

SEMICONDUCTOR LASER AND FLYING OPTICAL PICKUP FOR RECORDING/ REPRODUCING USING THE SAME

BACKGROUND OF THE INVENTION

The present invention relates to a semiconductor laser for generating a laser beam and an apparatus for recording and/or reproducing optical information on and/or from media such as an optical disk using the semiconductor laser as an optical source, and more particularly, to a semiconductor laser for performing high-density optical memory recording/reproducing on the same principle as a near-field scheme, and a flying optical pickup using the same.

Recently, along with the miniaturization of information apparatuses, a small and lightweight optical pickup for recording/reproducing has been required. In addition, a small recording medium which is well-suited for the small optical pickup has likewise been required. Thus, demand for an optical memory recording method for recording as much information as possible on a limited recording area has increased. As a result, as a method for such high-density optical memory recording, much research has been carried out on a method for reducing the size of an optical spot formed on recording media after being transmitted from an optical source of an optical pickup system.

As a small and lightweight optical pickup, a flying optical pickup has been well known. Such an optical pickup system is shown in FIG. 1. Here, a slider 2 "flies" slightly above the surface of an optical disk 1, riding on a cushion of air, and is supported by an arm 3. For searching information, slider 2 is driven by an actuator (not shown), to move along the radius of optical disk 1.

According to the conventional optical pickup system attached to the side of the slider, as shown in FIG. 2, the optical pickup system has a very simple structure composed of a semiconductor laser 4 as an optical source and an optical detector 5 for detecting a signal. Semiconductor laser 4 has a facet 6 (resonator) formed by reflection-coating the emitting end thereof which is directed downward and toward optical disk 1. Optical detector 5 is disposed behind (upward in FIG. 2) semiconductor laser 4 for generating an electrical signal from the detached rearward-radiated light of semiconductor laser 4.

In the conventional optical pickup system, the emitting end of semiconductor laser 4 rides on a cushion of air several microns (h) thick, and the emitted laser beam is re-incident to semiconductor laser 4 after being reflected from the optical disk. When the intensity of the re-incident light is modulated according to information recorded on optical disk 1, the optical output of semiconductor laser 4 is changed, and the signal of optical detector 5 is changed accordingly. Therefore, information recorded on optical disk 1 can be reproduced on the basis of the signal of optical detector 5.

Referring to FIG. 3 schematically showing a part of a crystal coupling body having a double hetero structure, the semiconductor laser used in the conventional flying optical pickup will be described in detail. The crystal coupling body of semiconductor laser 4 includes cladding layers made up of P region 7 and N region 8, and an active region 9 between the cladding layers. When forward current flows along the crystal coupling body of FIG. 3, carriers (electrons and holes) are transferred from the P and N regions 7 and 8 to active region 9, so that light generated by the re-coupling of electron and hole is emitted. The light is widely emitted (scattered) from the emitting end of active region 9. The spot size of a laser beam generated from semiconductor laser 4 is determined according to the cross-section area of active region 9 in the near field region of the emitting end thereof. Thus, even when the gap between the optical disk and the emitting end of active region 9 is narrowed, there is still a limit to the reduction of the spot, so that optimum high-density optical memory recording/reproducing cannot be obtained.

SUMMARY OF THE INVENTION

It is an object of the present invention to provide a semiconductor laser as an optical source for high-density optical memory recording and reproducing, by forming a substantially reduced optical spot in the near field region thereof.

It is another object of the present invention to provide a flying optical pickup for performing high-density recording and reproducing using the semiconductor laser, satisfying the above object.

To achieve an object of the present invention, there is provided a semiconductor laser having an active region from whose emitting end lased light is emitted, the semiconductor laser comprising: an aperture member for partially obstructing the light from the emitting end of the active region, wherein the aperture member has a hole whose diameter is smaller than the width of the active region, through which a laser beam is restrictively emitted.

To achieve another object of the present invention, there is provided a flying optical pickup for recording/reproducing optical information on/from an optical disk, the flying optical pickup comprising: an optical system including a semiconductor laser having an active region from whose emitting end lased light is emitted, an optical detector for detecting the rearward-radiated light of the semiconductor laser as an electrical signal, and an aperture member for partially obstructing the light from the emitting end of the active region, the aperture member having a hole whose diameter is smaller than the width of the active region, through which a laser beam is restrictively emitted; and a slider to which the optical system is attached and which rides on a cushion of air, above the surface of the optical disk.

According to the above-described present invention, the substantial lased light emitting surface of the semiconductor laser is restricted to the hole diameter of the aperture member. Thus, the gap between the optical disk and the emitting end of active region is narrowed to form an optical spot in the near field region of the semiconductor laser emitting end, so that a substantially reduced optical spot can be formed on the optical disk.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
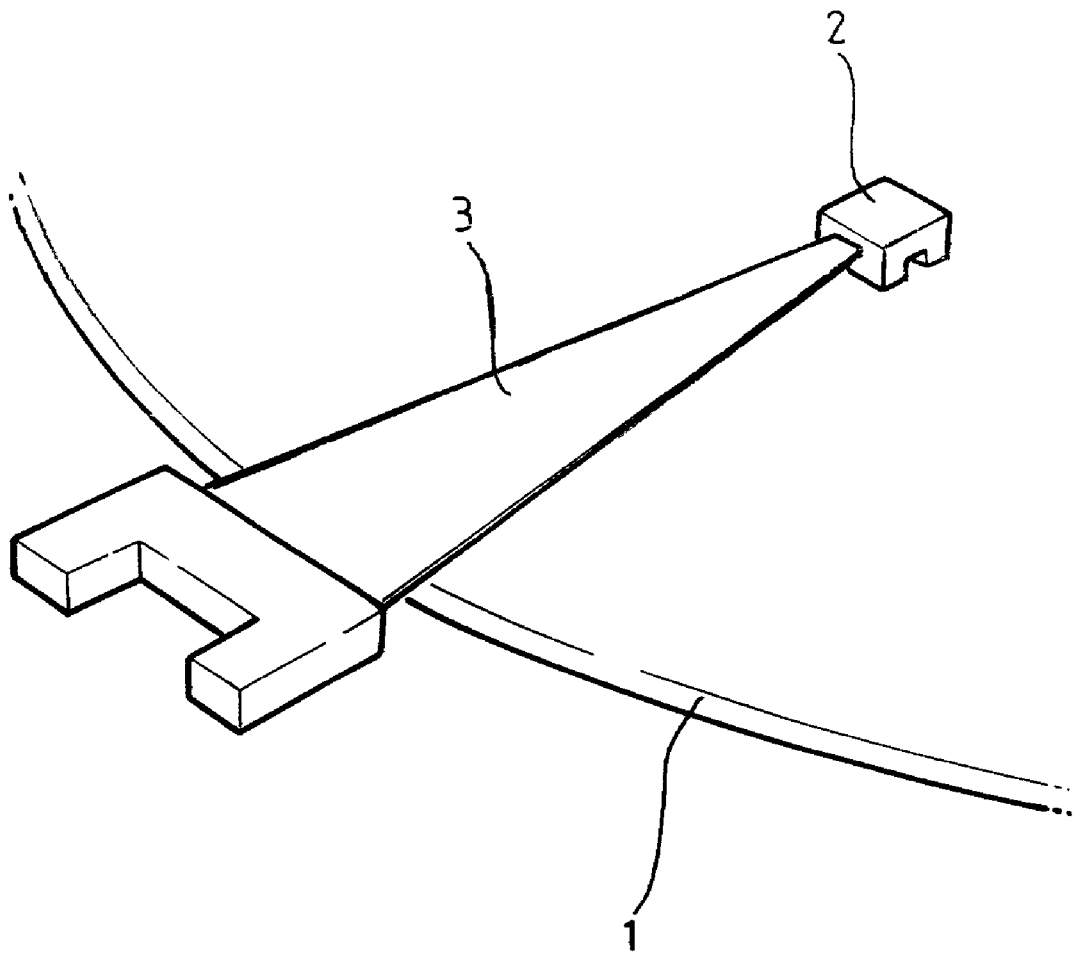
FIG. 1 is a perspective view of a conventional flying optical pickup for recording/reproducing optical information.
Figure 2:
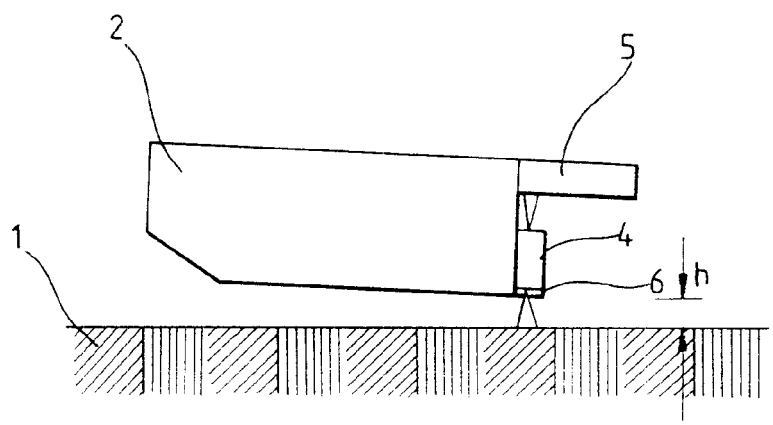
FIG. 2 is a side view showing an optical system attached to the side of the flying optical pickup of FIG. 1.
Figure 3:
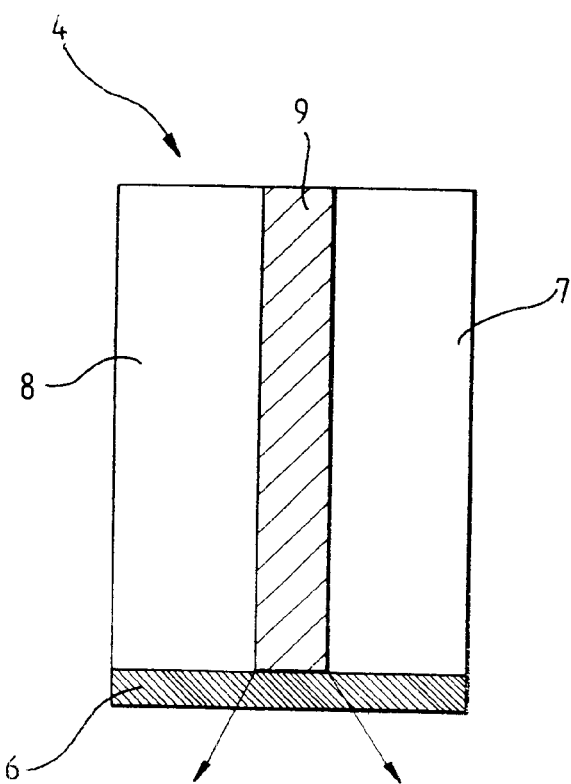
FIG. 3 is a cross-sectional view showing a crystal coupling structure of a semiconductor laser used in the optical system of the conventional flying optical pickup.
Figure 4:
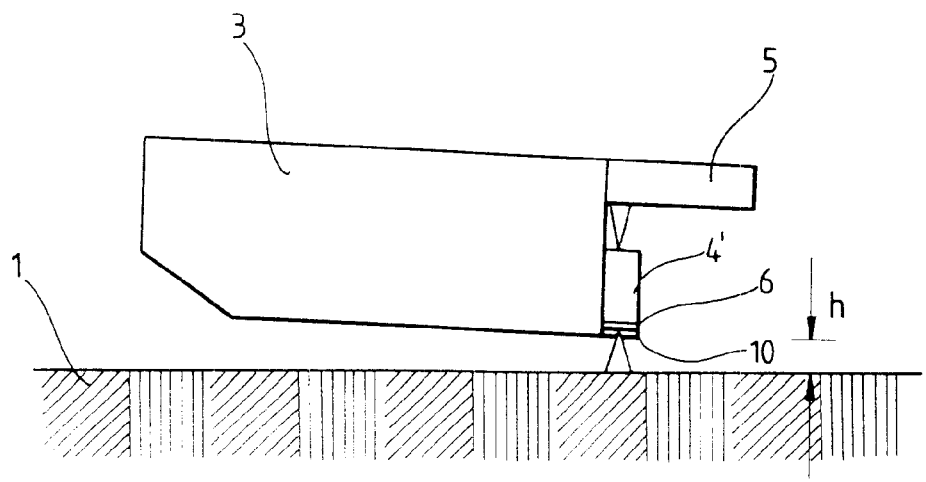
FIG. 4 is a side view showing an optical system attached to the side of a flying optical pickup according to the preferred embodiment of the present invention.

In FIG. 4, showing a flying optical pickup for recording/reproducing according to a preferred embodiment of the present invention, a slider 2 and an optical system attached thereto are shown. Slider 2 is supported by the arm shown in FIG. 1, to ride on an optical disk 1 atop cushion of air which maintains a gap (h) between the slider and disk, and is driven by an actuator (not shown) for creating a radial motion for searching information.

The optical system attached to the side of slider 2 includes a semiconductor laser 4' as an optical source having an improved structure, and an optical detector 5 for detecting the rearward-radiated light of semiconductor laser 4' and outputting a detected signal as an electrical signal. When a laser beam is emitted from the emitting end of semiconductor laser 4', the laser beam is re-incident to semiconductor laser 4' after being reflected from the surface of optical disk 1. Semiconductor laser 4' changes the optical output thereof according to the intensity change of the reflected beam being re-incident thereto. Here, optical detector 5 detects the signal which is changed by the change of optical output thereof, from the rearward-radiated light of semiconductor laser 4'.

Figure 5:
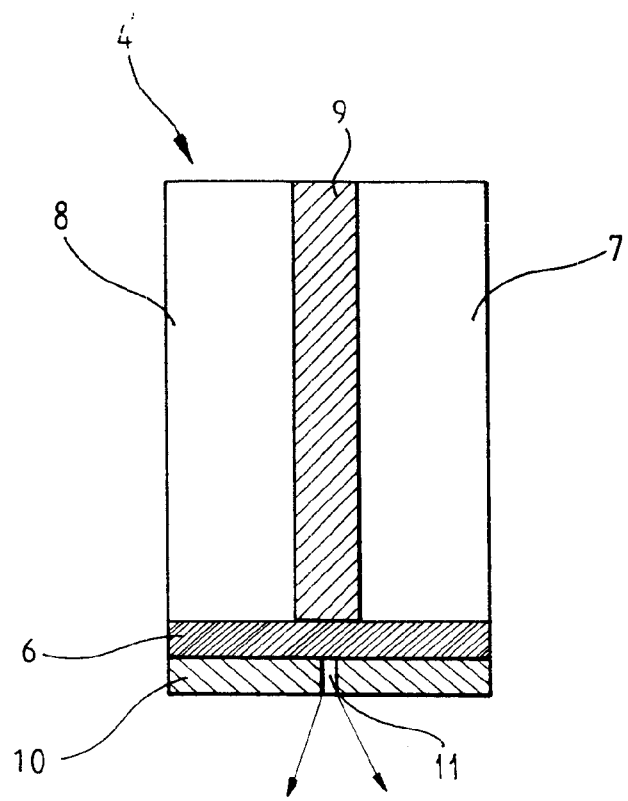
FIG. 5 is a cross-sectional view showing a crystal coupling structure of a semiconductor laser used in the optical system of the flying optical pickup according to the preferred embodiment of the present invention.

FIG. 5 shows the crystal coupling structure of the improved semiconductor laser 4'. Semiconductor laser 4' is comprised of cladding layers made up of P region 7 and N region 8, and an active region 9 coupled between the cladding layers. Semiconductor laser 4' is further comprised of a facet 6 as a resonator, which is formed by reflection-coating, and an aperture member 10 formed on facet 6. Aperture member 10, for partially obstructing emitted light, has a hole 11 through which the laser beam emitted from active region 9 is restrictively emitted, to thereby reduce spot size. Hole 11 is smaller than the width of active region 9. The optical spot formed on optical disk 1 by the laser beam emitted from hole 11 of aperture member 10 is reduced in proportion to the diameter of hole 11.

Using such a reduced spot, more information can be recorded on and reproduced from a given area of the optical disk, thus performing high-density optical memory recording/reproducing. For example, suppose that the diameter of the optical spot formed on the optical disk by the conventional optical pickup is about 1 $\mu$m. Here, if an aperture member having a 0.1 $\mu$m hole is used, recording and reproducing can be performed with a surface density hundred times that of the conventional device.

On the other hand, in semiconductor laser 4', the optical wave is output in correspondence to the diameter of hole 11 of aperture 10 of active region 9 in which the electron-hole transfer from regions 7 and 8 occurs. That is, the oscillation of the optical wave is restricted in accordance with the size difference between hole 11 and active region 9. Thus, there is no actual change of optical efficiency.

As shown in the above preferred embodiment of the present invention, high-density memory recording/reproducing can be stably performed through the substantial optical spot reduction in a small and lightweight flying optical pickup. The present invention is advantageous in that a semiconductor laser for high-density memory recording/reproducing can be achieved easily, without utilizing a short wavelength or a complicated manufacturing process.

What is claimed is:

1. A semiconductor laser having an active region from whose emitting end lased light is emitted, said semiconductor laser comprising:

an aperture member for partially obstructing the light from an emitting end of said active region at said emitting end, wherein said aperture member has a hole whose diameter is smaller than the width of said active region, through which a laser beam is restrictively emitted.

2. A semiconductor laser as claimed in claim 1, wherein said aperture member for partially obstructing the light from the emitting end is inside a near field region of light generated by said laser.

3. A flying optical pickup for recording/reproducing optical information on/from an optical disk, said flying optical pickup comprising:

an optical system including a semiconductor laser having an active region from whose emitting end lased light is emitted, an optical detector for detecting the rearward-radiated light of said semiconductor laser as an electrical signal, and an aperture member for partially obstructing the light from the emitting end of said active region, said aperture member having a hole whose diameter is smaller than a width of said active region at said emitting end, through which a laser beam is restrictively emitted; and a slider to which said optical system is attached and which rides on a cushion of air, above the surface of the optical disk.

4. A flying optical pickup as claimed in claim 3, wherein said aperture member for partially obstructing the light from the emitting end is inside a near field region of light generated by said laser.

5. A semiconductor laser for generating a laser beam, the semiconductor laser comprising:

an active region having an emitting end from which lased light can be emitted;

an aperture member adjacent the emitting end, the aperture member having a hole with a diameter smaller than a width of the active region, at said emitting end through which the lased light is restrictively emitted.

6. The semiconductor laser of claim 5, further comprising cladding layers including a P region and an N region, with the active region being located between the cladding layers.

* * * * *